No. 758,228. PATENTED APR. 26, 1904.
C. T. WESTLAKE.
CENTER BEARING FOR TRUCK BOLSTERS.
APPLICATION FILED JUNE 21, 1897. RENEWED MAR. 24, 1904.

NO MODEL. 4 SHEETS—SHEET 1.

WITNESSES:
Harry S. Rohrer
A. M. Parkins

INVENTOR:
Charles T. Westlake,
BY
Lennie & Goldsborough
ATTORNEYS.

No. 758,228. PATENTED APR. 26, 1904.
C. T. WESTLAKE.
CENTER BEARING FOR TRUCK BOLSTERS.
APPLICATION FILED JUNE 21, 1897. RENEWED MAR. 24, 1904.
NO MODEL. 4 SHEETS—SHEET 2.

No. 758,228. PATENTED APR. 26, 1904.
C. T. WESTLAKE.
CENTER BEARING FOR TRUCK BOLSTERS.
APPLICATION FILED JUNE 21, 1897. RENEWED MAR. 24, 1904.
NO MODEL. 4 SHEETS—SHEET 3.

Witnesses
H. H. Schott
J. O. McCleary

Inventor
Charles T. Westlake,
by Pennie & Goldsborough,
Attorneys

No. 758,228. PATENTED APR. 26, 1904.
C. T. WESTLAKE.
CENTER BEARING FOR TRUCK BOLSTERS.
APPLICATION FILED JUNE 21, 1897. RENEWED MAR. 24, 1904.
NO MODEL. 4 SHEETS—SHEET 4.
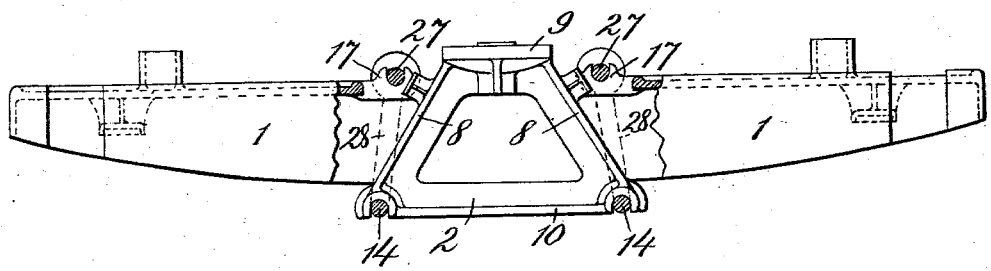
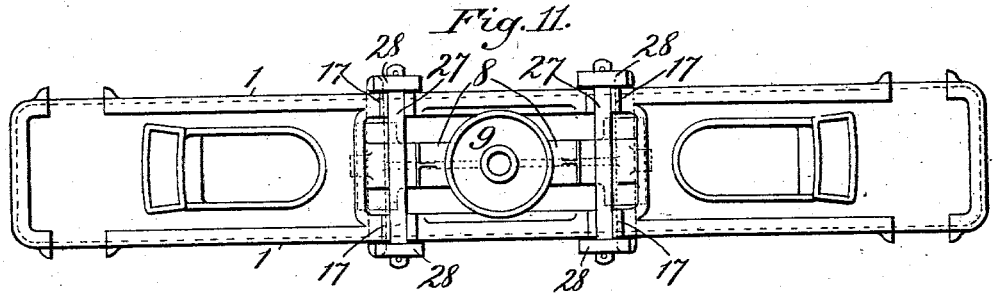

No. 758,228. Patented April 26, 1904.

UNITED STATES PATENT OFFICE.

CHARLES T. WESTLAKE, OF ST. LOUIS, MISSOURI, ASSIGNOR, BY MESNE ASSIGNMENTS, TO AMERICAN STEEL FOUNDRIES, A CORPORATION OF NEW JERSEY.

CENTER-BEARING FOR TRUCK-BOLSTERS.

SPECIFICATION forming part of Letters Patent No. 758,228, dated April 26, 1904.

Application filed June 21, 1897. Renewed March 24, 1904. Serial No. 199,852. (No model.)

*To all whom it may concern:*

Be it known that I, CHARLES T. WESTLAKE, a citizen of the United States, residing at the city of St. Louis, in the State of Missouri, have invented certain new and useful Improvements in Center-Bearings for Truck-Bolsters; and I do hereby declare the following to be a full, clear, and exact description of the invention, such as will enable others skilled in the art to which it appertains to make and use the same.

My invention relates to truck-bolsters for railway rolling-stock; and its object is to provide a truck-bolster with a center-bearing of improved construction capable of swinging laterally to avoid shocks and jars in travel and the consequent strain upon the truck and running-gear thereof.

Figure 1:
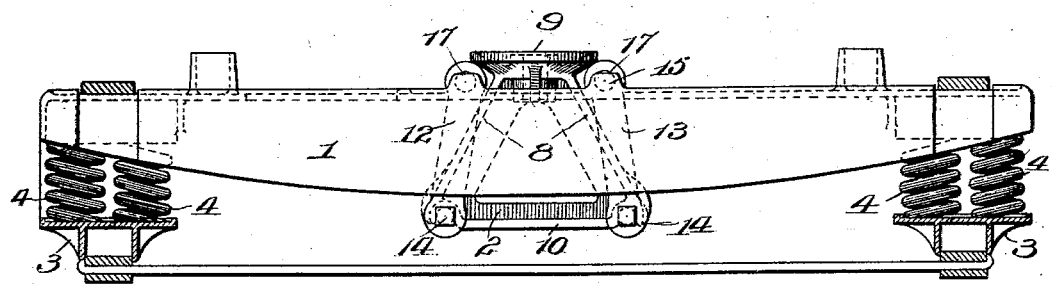
Figure 2:
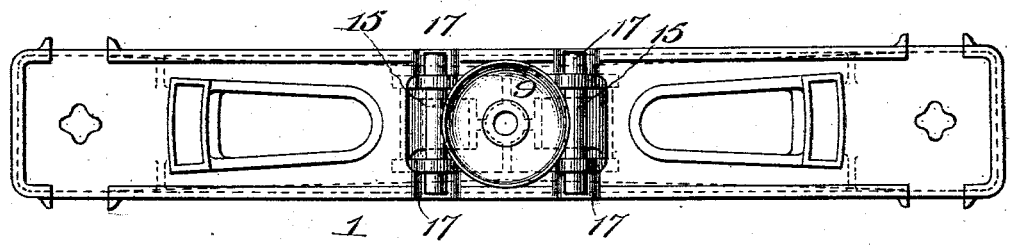
Figure 3:
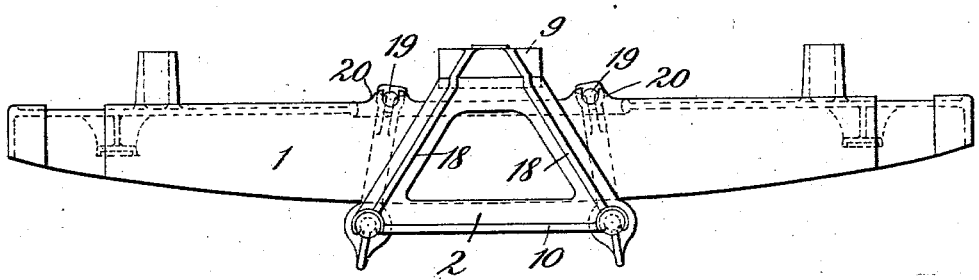
Figure 4:
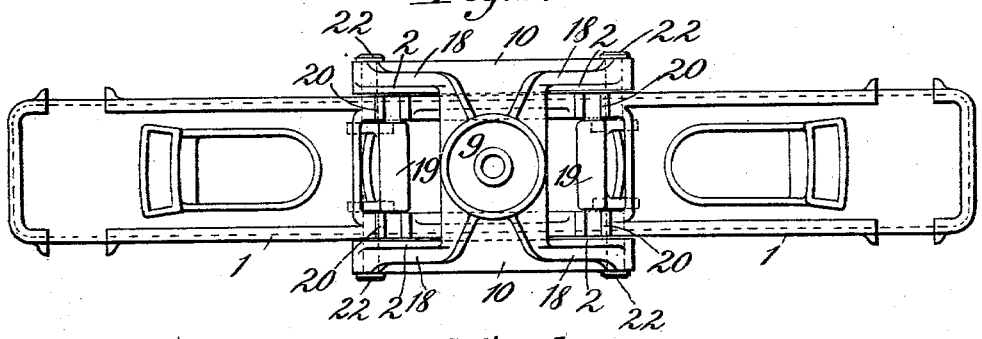
Figure 5:
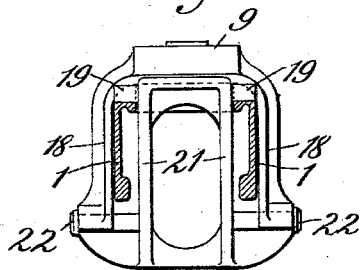
Figure 6:
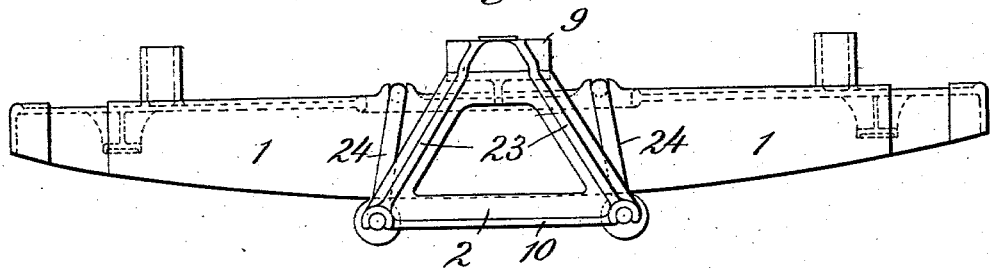
Figure 7:
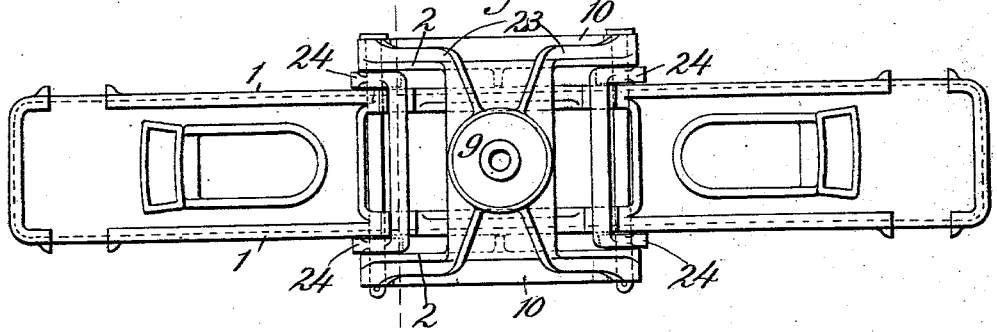
Figure 8:
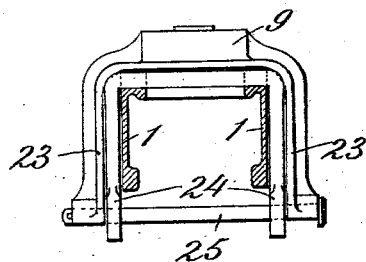
Figure 9:
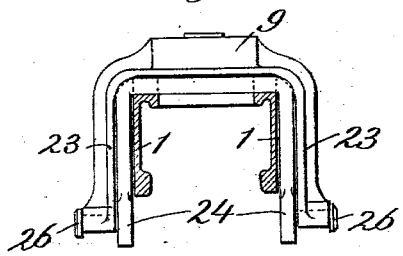

In the accompanying drawings, Figure 1 is a side elevation of one form of bolster provided with my improved center-bearing. Fig. 2 is a top plan view of the same. Figs 3, 4, and 5 are respectively a side elevation, plan view, and section of a modification. Figs. 6, 7, and 8 are respectively a side elevation, plan view, and section of another modification. Fig. 9 is a sectional view illustrating a further slight modification; and Figs. 10 and 11 are respectively a side elevation, partly in section, and a plan view of a still further modification.

Similar numerals of reference indicate similar parts throughout the several views.

The bolster 1 of any suitable cross-section may, as indicated in Fig. 1, be supported upon the frame 3 3 of the truck by means of springs, as 4, interposed between the bolster and said truck-frame in any desired or convenient relationship.

The bolster is provided at its center with an opening to receive the center-bearing, which in the form shown in Figs. 1 and 2 comprises a plate 9, perforated centrally to receive the king-bolt, and a depending frame or basal projection of substantially triangular form consisting of the diagonals 8 and bottom piece 10, extending downwardly between the side webs of the bolster and provided with a strengthening-rib 2.

The center-bearing is supported by and connected to the bolster by two pairs of links or hangers 12 and 13. The lower ends of these links or hangers are pivotally secured to the lower ends or angles of the depending triangular frame by bolts or rods 14, while their upper ends are pivotally secured upon parallel pins 15, the ends of which are seated in bearings formed in the oppositely-arranged lugs 17, projecting from the side webs of the bolster.

The construction thus described permits a limited swinging movement of the center-bearing on the pins 15, the pivotal connections 14 between the triangular frame and the lower ends of the links or hangers coöperating to allow such lateral swinging movement.

It will be observed that the center-bearing is suspended between the side webs of the bolster entirely by means of the swinging hangers and may be readily removed from the bolster when broken or unduly worn.

In Figs. 3 to 12, inclusive, I have illustrated modified constructions of the center-bearing and bolster.

In the construction shown in Figs. 3, 4, and 5 the sides 18 straddle the bolster. The center-bearing in this construction is suspended by means of rock pins or journals 19, supported in bearings 20 on the bolster, and depending arms or hangers 21, secured by bolts 22 to the corners of the frame.

In the construction shown in Figs. 6, 7, 8, and 9 the sides 23, as well as the bail-like hangers 24, straddle the bolster. Through-bolts 25, as shown in Figs. 7 and 8, extending across the bolster, or shorter bolts 26, (shown in Fig. 9,) pivotally secure the ends of the hangers to the sides of the frame.

In the modification shown in Figs. 10 and 11 the frame of the swinging bearing is arranged between the sides of the bolster and is suspended by pins 27, connected to the frame by links 28, arranged on opposite sides of the bolster instead of within the opening in the bolster, as in Figs. 1 and 2.

Having thus described my invention, what I claim is—

1. In a center-bearing for trucks, the combination of the bolster supported at its ends on the truck-frame, a bearing-plate having a downwardly and outwardly flaring depending frame or basal projection straddling the bolster, parallel transverse pins journaled in fixed bearings on the upper side of the bolster, and depending links and hangers connected at their upper ends to the pins and at their lower ends to similar pins at opposite ends of the depending frame.

2. In a center-bearing for trucks, the combination of the bolster supported at its ends on springs seated on the truck-frame, a bearing-plate having a downwardly and outwardly flaring depending frame or basal projection, parallel pins journaled in fixed transverse bearings on the upper side of the bolster, similar pins at opposite ends of the depending frame, and links or hangers having an unyielding connection at their upper and lower ends with the pins.

In testimony whereof I affix my signature in presence of two witnesses.

CHARLES T. WESTLAKE.

Witnesses:
   J. W. ROBINSON,
   C. K. BULL.